(12) United States Patent
Ekberg et al.

(10) Patent No.: US 9,362,050 B2
(45) Date of Patent: Jun. 7, 2016

(54) INNER DRIVE FOR MAGNETIC DRIVE PUMP

(71) Applicant: Sundyne Corporation, Arvada, CO (US)

(72) Inventors: Andrew Magnus Ekberg, Superior, CO (US); Paul Roland Beauregard, Jr., Lafayette, CO (US); Kerry E. Kramlich, Littleton, CO (US); Scott Marvin Allen, Golden, CO (US); David M. Carr, Superior, CO (US); Ray L. Hauser, Boulder, CO (US)

(73) Assignee: SUNDYNE, LLC, Arvada, CO (US)

( * ) Notice: Subject to any disclaimer, the term of this patent is extended or adjusted under 35 U.S.C. 154(b) by 612 days.

(21) Appl. No.: 13/715,292

(22) Filed: Dec. 14, 2012

(65) Prior Publication Data

US 2013/0106018 A1 May 2, 2013

Related U.S. Application Data

(62) Division of application No. 12/718,236, filed on Mar. 5, 2010, now Pat. No. 8,333,666, which is a division of application No. 11/009,613, filed on Dec. 10, 2004, now abandoned.

(51) Int. Cl.
*H01F 41/02* (2006.01)
*H02K 1/27* (2006.01)
(Continued)

(52) U.S. Cl.
CPC .............. *H01F 41/02* (2013.01); *F04D 13/027* (2013.01); *H02K 1/278* (2013.01); *H02K 1/30* (2013.01); *H02K 5/124* (2013.01); *H02K 7/14* (2013.01); *H02K 15/12* (2013.01); *Y10T 464/30* (2015.01)

(58) Field of Classification Search
CPC ....... H01F 41/02; F04D 13/027; H02K 5/124; H02K 1/30; H02K 1/278; Y10T 464/30
USPC ............ 264/275, 279, 279.1; 417/420, 423.7; 310/45, 104; 464/29; 29/596
See application file for complete search history.

(56) References Cited

U.S. PATENT DOCUMENTS 2,612,390 A  9/1952 Lewis
3,205,827 A  9/1965 Zimmermann
(Continued)

FOREIGN PATENT DOCUMENTS

CN  2612145  4/2004
DE  34 13 930 C2  10/1985
(Continued)

OTHER PUBLICATIONS

European Search Report and Written Opinion for European Application No. EP 10 01 5752 completed on Dec. 11, 2013.
(Continued)

*Primary Examiner* — Yogendra Gupta
*Assistant Examiner* — Ninh Le
(74) *Attorney, Agent, or Firm* — Carlson, Gaskey & Olds, P.C.

(57) ABSTRACT

An inner drive for a magnetic drive pump includes a magnet supported on a yoke. The inner drive is driven about an axis to pump a corrosive process fluid. The magnet and yoke are fully encapsulated during the molding process to completely surround the magnet and yoke in a protective plastic shell. A sleeve is arranged radially outwardly of the magnet to provide further protection. Backing rings are arranged on either side of the magnet. A bonding material joins the plastic shell to the backing rings and sleeve to prevent a space from forming beneath the plastic shell that would become filled with the process fluid once it has permeated the plastic shell. A protective coating is arranged on at least a portion of the magnet to further insulate the magnet from the process fluid.

4 Claims, 2 Drawing Sheets

(51) Int. Cl.
  *H02K 1/30* (2006.01)
  *H02K 5/124* (2006.01)
  *H02K 7/14* (2006.01)
  *H02K 15/12* (2006.01)
  *F04D 13/02* (2006.01)

(56) References Cited

U.S. PATENT DOCUMENTS

| | | |
|---|---|---|
| 3,465,681 A | 9/1969 | Zimmermann |
| 3,545,892 A | 12/1970 | Zimmermann |
| 3,655,206 A | 4/1972 | Adams |
| 3,762,724 A | 10/1973 | Porter |
| 3,802,804 A | 4/1974 | Zimmermann |
| 3,932,068 A | 1/1976 | Zimmermann |
| 3,938,914 A | 2/1976 | Zimmermann |
| 4,047,847 A | 9/1977 | Oikawa |
| 4,080,112 A | 3/1978 | Zimmermann |
| 4,115,040 A | 9/1978 | Knorr |
| 4,120,618 A | 10/1978 | Klaus |
| 4,152,099 A | 5/1979 | Bingler |
| 4,304,532 A | 12/1981 | McCoy |
| 4,350,346 A | 9/1982 | Fowler |
| 4,389,169 A | 6/1983 | DeDionigi |
| 4,414,523 A | 11/1983 | Pieters |
| 4,487,557 A | 12/1984 | Ruyak et al. |
| 4,613,289 A | 9/1986 | Kotera |
| 4,645,432 A | 2/1987 | Tata |
| 4,674,960 A | 6/1987 | Rando et al. |
| 4,722,661 A | 2/1988 | Mizuno |
| 4,792,712 A | 12/1988 | Stokes |
| 4,837,472 A | 6/1989 | Kotera |
| 4,850,818 A | 7/1989 | Kotera |
| 5,017,102 A | 5/1991 | Shimaguchi et al. |
| 5,062,284 A | 11/1991 | Kubo et al. |
| 5,066,200 A | 11/1991 | Ooka |
| 5,149,253 A * | 9/1992 | Miyamoto et al. ............ 417/353 |
| 5,201,532 A | 4/1993 | Salesky et al. |
| 5,253,986 A | 10/1993 | Bond et al. |
| 5,288,213 A | 2/1994 | Nasr |
| 5,340,273 A | 8/1994 | Rockwood |
| 5,375,853 A | 12/1994 | Wasser et al. |
| 5,470,622 A | 11/1995 | Rinde et al. |
| 5,501,582 A | 3/1996 | Gautier et al. |
| 5,525,039 A | 6/1996 | Sieghartner |
| 5,562,406 A | 10/1996 | Ooka et al. |
| 5,564,908 A | 10/1996 | Phillips et al. |
| 5,576,584 A | 11/1996 | Kusumoto et al. |
| 5,599,112 A | 2/1997 | Klein |
| 5,624,245 A | 4/1997 | DeClerck et al. |
| 5,735,668 A | 4/1998 | Klein |
| 5,763,973 A | 6/1998 | Cramer |
| 5,779,449 A | 7/1998 | Klein |
| 5,796,349 A | 8/1998 | Klein |
| 5,861,695 A | 1/1999 | Brassard |
| 5,895,203 A | 4/1999 | Klein |
| 5,915,931 A | 6/1999 | Lindner et al. |
| 5,961,301 A | 10/1999 | Wasserman et al. |
| 5,997,264 A | 12/1999 | Klein et al. |
| 6,264,440 B1 | 7/2001 | Klein et al. |
| 6,293,772 B1 | 9/2001 | Brown et al. |
| 6,293,773 B1 | 9/2001 | Doberstein et al. |
| 6,380,833 B1 | 4/2002 | Nguyen et al. |
| 6,388,346 B1 | 5/2002 | Lopatinsky et al. |
| 6,480,364 B1 | 11/2002 | Thanomsat et al. |
| 6,547,539 B2 | 4/2003 | Izraelev |
| 6,908,291 B2 | 6/2005 | Klein et al. |
| 7,101,158 B2 | 9/2006 | Hembree et al. |
| 2004/0013546 A1 | 1/2004 | Klein et al. |
| 2004/0018104 A1 | 1/2004 | Watkins |

FOREIGN PATENT DOCUMENTS

| | | | |
|---|---|---|---|
| EP | 0 334 589 | 9/1989 | |
| EP | 0 592 113 | 4/1994 | |
| EP | 0 633 648 | 1/1995 | |
| EP | 0 665 378 | 8/1995 | |
| EP | 1 017 943 | 2/1999 | |
| EP | 1 039 615 | 9/2000 | |
| JP | 57108493 | 7/1982 | |
| JP | 58124091 | 7/1983 | |
| JP | 63-138493 | 9/1988 | |
| JP | 11-136891 | 5/1999 | |
| JP | 11-192422 | 7/1999 | |
| JP | 2000-205173 | 7/2000 | |
| JP | 2000205173 A * | 7/2000 | ............ F04D 13/02 |
| JP | 2002-138950 | 5/2002 | |
| JP | 2005-39255 | 2/2005 | |
| WO | 81/01727 | 6/1981 | |
| WO | 97/21031 | 6/1997 | |
| WO | 99/06711 | 2/1999 | |
| WO | 00/06899 | 2/2000 | |
| WO | 03/016718 | 2/2003 | |

OTHER PUBLICATIONS

Partial International Search Report for PCT Application No. PCT/US2005/044062.
Ansimag Simple by Design, "Non-Metallic Mag-Drive Centrifugal Pumps," Sundyne Corporation, Ansimag Incorporated 2002.
W. Douglas Obal, "Permeation: Its Effects on Teflon ETFE Coatings on Stainless Steel Corrosive Fume Exhaust Duct," Semiconductor Fabtech—11th Edition, pp. 131-136.
Sloan, Jeff, "Tooling for Encapsulated Molding," IMM Magazine Article Archive, pp. 1-3, IMM—Jan. 1997, http://immnet.com/articleprintable.html?article=1362.
International Preliminary Report on Patentability for PCT Application No. PCT/US2005/044062, Jun. 21, 2007.

* cited by examiner

INNER DRIVE FOR MAGNETIC DRIVE PUMP

This application is a divisional application of U.S. application Ser. No. 12/718,236, filed on Mar. 5, 2010, which is a divisional of U.S. application Ser. No. 11/009,613, filed on Dec. 10, 2004.

BACKGROUND OF THE INVENTION

This application relates to a magnetic drive centrifugal pump.

Magnetic drive centrifugal pumps include a wet portion, which contains the process fluid that is being pumped, and a dry portion having a drive, which provides power to the pump fluid. The dry portion is exposed only to the atmosphere surrounding the pump. In one typical magnetic drive design, an inner and outer drive are separated by a containment shell, which prevents the pump fluid from escaping to the environment. The outer drive, which is usually driven by an electric motor, is located in the dry portion and magnetically drives the inner drive in the wet portion that is attached to a pump impeller. Since magnetic drive pumps are sealless, they are often selected to pump very acidic or caustic process fluids, such as hydrochloric acid, nitric acid and sodium hypochlorite.

Both the outer and inner drives have a series of magnets mounted around their peripheries. Each magnet is synchronously coupled to a respective magnet that is of an opposite pole on the other drive. The attraction between the magnets results in a magnetic coupling between the two drives causing the inner drive to rotate at the same speed of the outer drive, which is driven by the motor. The inner and outer drives must be located relatively close together for efficient power transmission, which requires a relatively small clearance to be maintained between the containment shell and each drive. In one example, the clearance is approximately 0.060 inch.

In one type of magnetic drive pump, the inner drive magnets are primarily protected from the corrosive process fluid by a chemically resistant plastic shell, which is typically injection molded around the magnets of the inner drive. Corrosive process fluid eventually permeates the plastic shell, thus attacking the underlying magnets. Once the corrosive process fluid has permeated the plastic coating, the shell swells causing interference between the inner drive and the containment shell and pump failure.

Therefore, what is needed is an inner drive that is more resistant to swelling once the process fluid has permeated the plastic shell.

SUMMARY OF THE INVENTION

The present invention provides a magnetic pumping element, such as an inner drive of a magnetic drive pump, that includes additional protections from corrosive process fluid. The inner drive includes a yoke with multiple magnets supported on the yoke. A protective coating surrounds at least a portion of the magnet, and in one example, extends partially over the yoke. Typically, a metallic member, such as a nickel-based alloy sleeve, is arranged proximate to the magnet. A plastic shell is arranged proximate to the sleeve. In one example, the shell completely encapsulates the yoke and magnet as a result of the molding process so that further operations, such as plastic welding, are not required to encapsulate the yoke and magnet.

A bonding material is arranged between the plastic shell and metallic sleeve, including backing rings, joining the plastic shell and metallic sleeve to one another. The bonding material prevents formation of a cavity that can become filled with the corrosive process fluid once it has permeated the shell. Additionally, the bonding material prevents the process fluid from reacting with the sleeve and from migrating between the plastic shell and the metallic sleeve/backing rings and into the joints and magnet areas Accordingly, the present invention provides an inner drive that is more resistant to swelling once the process fluid has permeated the plastic shell.

These and other features of the present invention can be best understood from the following specification and drawings, the following of which is a brief description.

DETAILED DESCRIPTION OF THE PREFERRED EMBODIMENT

Figure 1:
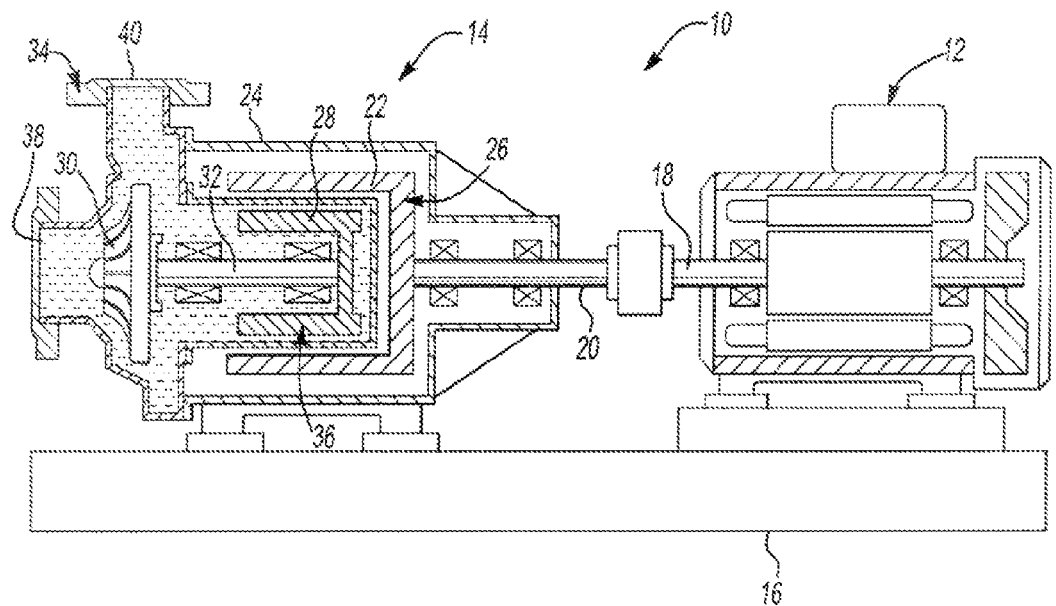
FIG. 1 is a cross-sectional view schematically depicting a magnetic drive centrifugal pump assembly.

A magnetic drive centrifugal pump assembly 10 is schematically shown in FIG. 1. The assembly 10 includes a motor 12 that drives a pump 14. The motor 12 and pump 14 are supported by a frame 16. The motor 12 includes a drive shaft 18 that is coupled to a driven shaft 20 of the pump 14.

An outer drive 22 is supported by the driven shaft 20. The outer drive 22 includes magnets mounted on a periphery of the outer drive for magnetically driving an inner drive 28, which supports magnets having an opposite pole of the magnets on the outer drive 22.

The pump 14 includes a housing 24 that supports the driven shaft 20 and outer drive 22 in a dry portion 26 of the pump 14. A pump case 34 provides a wet portion 36 for holding the process fluid, which is separated from the dry portion 26. The pump case 34 houses the inner drive 28, which is coupled to an impeller 30. The impeller 30 rotates about a stationary shaft 32. The process fluid is pumped from an inlet 38 to an outlet 40 by the impeller 30.

Figure 2:
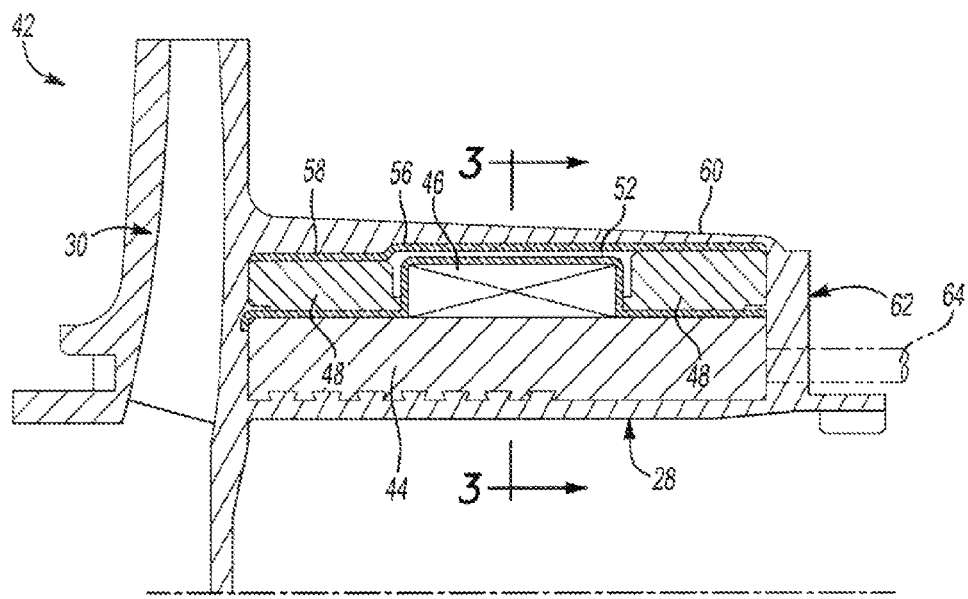
FIG. 2 is a partial cross-sectional view of an integrated impeller and inner drive assembly.

In the example shown in FIG. 2, the inner drive 28 and impeller 30 are formed in such a way so as to provide an integral, or separable, impeller and inner drive assembly 42. A typical inner drive 28 includes a yoke 44 that supports multiple magnets 46 about its outer periphery. The yoke 44 is typically constructed from a magnetic conductor, such as ductile iron, to absorb the magnetic flux lines behind the magnets 46. Front and/or rear backing rings 48 are arranged on the yoke adjacent to either side of the magnets 46. The backing rings 48 are typically constructed from a non-magnetic material such as stainless steel so that they do not interrupt the magnetic flux lines on the working side of the magnets.

A sleeve 56 is arranged radially outboard of the magnets 46 to protect the magnets 46 from process fluid. The sleeve 56 may be constructed from a nickel-based alloy such as Hastelloy or Inconel. The sleeve 56 may be a thin can that is pressed over the magnets 46. Alternatively, the sleeve 56 may be a machined enclosure that is integral with and extends axially from one of the backing rings 48.

A shell 60 is molded about the yoke 44, magnets 46, backing rings 48 and sleeve 56 to protect the components from the process fluid. The shell 60 may be constructed from a fluoroplastic such as Ethylene Tetrafluoroethylene (ETFE). Other melt processible fluoropolymers may also be used, such as Perfluoroalkoxy (PFA). The resins may also be glass or carbon fiber reinforced. Fibers in the range of 10-35%, for example, may be used, and in one example, 20%.

Figure 3:
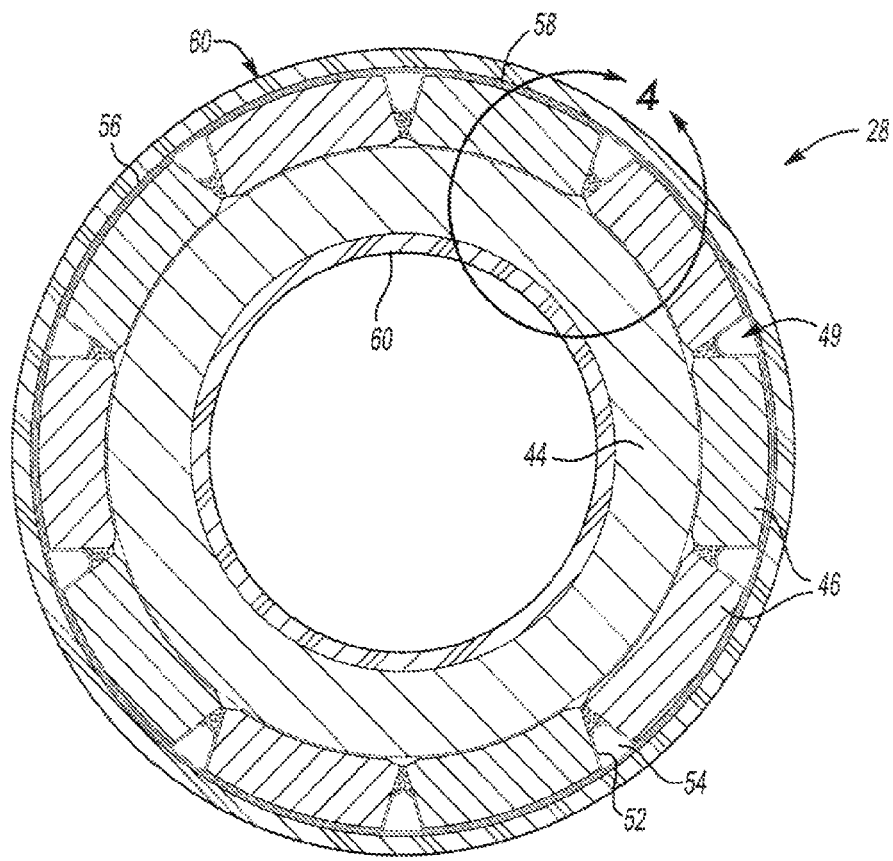
FIG. 3 is a cross-sectional view of the inner drive shown in FIG. 2 and taken along line 3-3.
Figure 4:
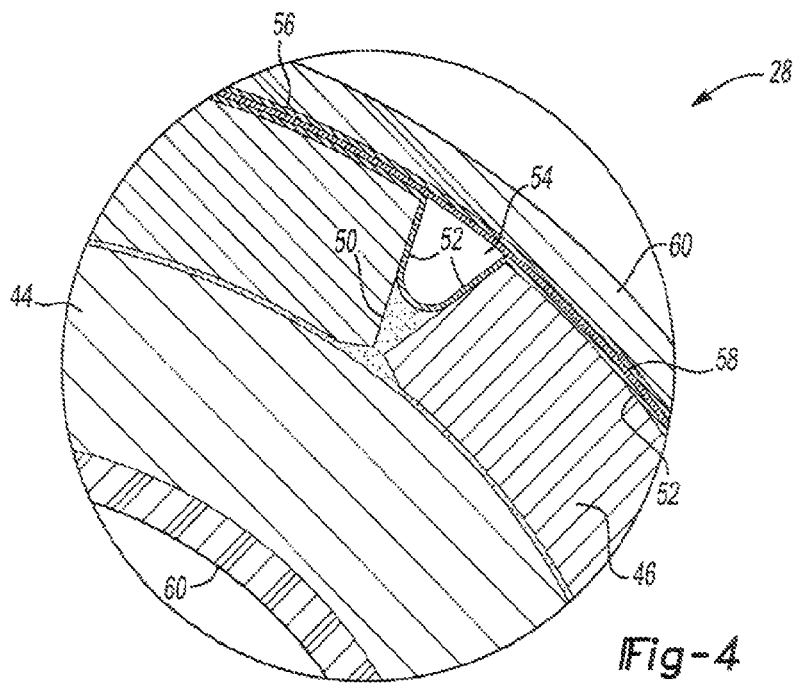
FIG. 4 is an enlarged view of the area indicated by circle 4 in FIG. 3.

In the prior art, only the shell 60 and sleeve 56 protected the magnets 46 from the process fluid that permeated the shell 60. However, increased protection from the corrosive process fluid is desired. To this end, the inventive inner drive 28 also includes a powder coating 52 arranged over the magnets 46. The powder coating 52 may extend from one axial end of the yoke 44 to the other end of the yoke 44 providing a barrier that seals the magnets 46 relative to the yoke 44. The powder coating 52 is arranged between the backing rings 48 and the yoke 44, in the example shown. Referring to FIG. 3, generous fillets 50, currently made using potting material 54, are provided in gaps 49 between the magnets 46. The fillets 50 provide a smooth transition between the magnets 46 and yoke 44, which creates a smooth, continuous coating that is free of pits and cracks. Potting material 54, which is typically used in inner drives, fills the rest of the gaps 49 between the magnets 46 and sleeve 56 in order to prevent sleeve rupture as a result of injection molding.

One suitable powder coating is an epoxy polyester hybrid, which has a low cure temperature (250-275° F.). One example hybrid has approximately 50% epoxy and 50% polyester. The powder coating preferable has good adhesion, chip resistance, and chemical resistance. More than one coat may be desirable. The coating must withstand the molding temperatures of the shell 60 (over 600° F.). A table of the properties of examples suitable potting and powder coatings materials follows.

It has been discovered that the process fluid reacts with the sleeve 56 once it has permeated the shell 60 resulting in salts and other compounds that create a build up of solid material under the plastic shell 60. This build up of material often results in localized swelling of the shell 60 that leads to failure of the pump 14. Additionally, process fluid that has permeated the shell 60 may be subjected to a pumping effect by the flexing of the shell 60. This agitation of process fluid that has permeated the shell 60 accelerates corrosion of the sleeve 56 and forces product into joints and magnet areas.

To address this problem, the inventive inner drive 28 also employs a bonding interface between the sleeve 56 and any other potentially reactive material, such as the backing rings 48 and the shell 60. This prevents the formation of a cavity that can fill with solid material or process fluid.

The bonding interface 58 is provided by a suitable bonding material capable of joining the material of the shell 60 to the material of the sleeve 56 and/or backing rings 48. In one example, the bonding material may be a bonding primer that is a blend of a polymeric adhesive and a fluoropolymer. The bonding primer, in one example, is stable up to 550° F. with negligible to zero out gassing. Two examples of suitable formulations are:

Formulation 1:
PelSeal PLV2100 VITON elastomer, 33% solids—13 grams
PelSeal accelerator no. 4—0.5 milliliters
DuPont ETFE powder 532-6210—4.5 grams
Formulation 2:
Methyl ethyl ketone—13 grams
PelSeal PLV2100 VITON elastomer, 33% solids—13 grams
PelSeal acceleration no. 4—0.5 milliliters
DuPont ETFE powder 532-6210—4.5 grams Formulation 2 results in a lower viscosity, and is preferably sprayed on as opposed to application by brush or pad.

The yoke 44, magnets 46, backing rings 48, and sleeve 56 are typically assembled into a unit and the shell 60 molded about the unit. A typical molding process results in a void in a molding support region 62. The molding support region 62 results from a support 64 used during the molding process that locates the unit in a desired position as the shell is molded

| Property | Fillet and Potting Material | Powder Coating |
| --- | --- | --- |
| Product Name | 3M epoxy 1 part adhesive 2214 HD PMF | Sherwin Williams Powdura Powder Coating - Epoxy Polyester Hybrid |
| Base | Modified epoxy base | Polyester (80%), epoxy (20%) |
| Major Ingredients | Epoxy resin, aluminum pigments, synthetic elastomer | polyester and epoxy |
| Adhesion | | ASTM D-3359 - No failure with 1/16" squares (cross hatch) |
| Environmental Resistance | ASTM D-1002 - 1910 psi steel overlap shear 365 days in 100% RH | ASTM D-B117 - passes 500 hr min salt fog test |
| Outgassing | Minimal | NA |
| Flexibility | See hardness and strength data | ASTM D-522 - pass on 1/8" mandrel bend |
| Density | 1.5 g/ml | |
| Impact Resistance | | ASTM D-2794 - 100 lbs direct & reversed - excellent performance |
| Viscosity | >1,000,000 cps-Brookfield (paste). Heated to thin for potting fill | Powder consistency prior to oven bake |
| Hardness | 85 Shore D hardness (approx) | ASTM D-3363 (for thin coatings) - 2H Pencil hardness |
| Ultimate Tensile Strength | 10,000 psi | |
| Modulus of Elasticity | 750,000 | |
| Coeff. of Thermal Expansion (cured) | 49 x 10-6 in/in/C. (0-80 C.) | |
| Cure Temp or Coating Temp | 2 hrs @ 225 F. cure temp | 275 F. coating temp |
| Steel T-Peel (ASTM D-1876) | 50 lbs per inch of width | | about the unit. This void in the molding support region 62 must be filled by a secondary fusing operation, such as plastic welding. The fusing creates a boundary interface where poor bonding between the base material and weld material can exist. This frequently results in a weakened area, which can provide a premature leak path for the corrosive process fluid to enter and attack the magnets 46.

The present invention utilizes a molding process resulting in shell 60, fully encapsulating the unit. The support 64, which may be multiple pins, are retracted at a desired time during the molding process so that the material forming the shell 60 fills the mold support region 62 during molding. The formulations of plastic used for the shell 60 better enable the flow fronts of material within the mold to quickly fill the molding support region once the supports 64 have retracted.

Although a preferred embodiment of this invention has been disclosed, a worker of ordinary skill in this art would recognize that certain modifications would come within the scope of this invention. In particular, the materials disclosed and their properties are exemplary only and are no way intended to limit the scope of the invention. For these and other reasons, the following claims should be studied to determine the true scope and content of this invention.

What is claimed is:

1. A method comprising steps of:
   inserting a yoke and a magnet as a unit into a mold;
   supporting the unit within the mold by a support at a molding support region on the unit;
   filling the mold with plastic resin;
   retracting the support from the molding support region at a predetermined time during molding process;
   filling the molding support region with the plastic resin and fully encapsulating the unit with the plastic resin within the mold to provide a shell; and
   wherein the unit further includes a backing ring, a sleeve and a protective coating, wherein the backing ring is arranged radially outwardly of the yoke and axially adjacent to the magnet, the sleeve is arranged radially outwardly of the backing ring and the protective coating, and the protective coating arranged between the backing ring and yoke and between the backing ring and magnet.

2. The method according to claim 1, wherein the shell is continuous, uninterrupted, and free of voids at the molding support region.

3. The method according to claim 1, wherein the supporting step includes locating the unit within the mold in a desired position.

4. The method according to claim 1, wherein the protective coating is an epoxy polyester powder coating, and the shell contains at least one of an ETFE and PFA.

* * * * *